United States Patent
Chen et al.

(10) Patent No.: US 8,909,836 B2
(45) Date of Patent: Dec. 9, 2014

(54) INTERRUPT CONTROLLER, APPARATUS INCLUDING INTERRUPT CONTROLLER, AND CORRESPONDING METHODS FOR PROCESSING INTERRUPT REQUEST EVENT(S) IN SYSTEM INCLUDING PROCESSOR(S)

(71) Applicant: Andes Technology Corporation, Hsin-Chu (TW)

(72) Inventors: Hsin-Ming Chen, Hsinchu (TW); Chi-Chang Lai, Hsinchu (TW)

(73) Assignee: Andes Technology Corporation, Science-Based Industrial Park, Hsin-Chu (TW)

( * ) Notice: Subject to any disclaimer, the term of this patent is extended or adjusted under 35 U.S.C. 154(b) by 225 days.

(21) Appl. No.: 13/647,365

(22) Filed: Oct. 8, 2012

(65) Prior Publication Data

US 2014/0101352 A1 Apr. 10, 2014

(51) Int. Cl.
*G06F 13/24* (2006.01)
(52) U.S. Cl.
CPC ..................................... *G06F 13/24* (2013.01)
USPC ........................... 710/266; 710/260; 710/268
(58) Field of Classification Search
CPC ....... G06F 9/4812; G06F 9/4818; G06F 9/50; G06F 9/5038; G06F 9/505
USPC .................................................. 710/260–269
See application file for complete search history.

(56) References Cited

U.S. PATENT DOCUMENTS

| | | | | |
|---|---|---|---|---|
| 5,495,615 A | * | 2/1996 | Nizar et al. | 710/260 |
| 5,701,496 A | * | 12/1997 | Nizar et al. | 710/266 |
| 5,758,169 A | * | 5/1998 | Nizar et al. | 710/266 |
| 6,456,628 B1 | * | 9/2002 | Greim et al. | 370/466 |
| 2002/0133658 A1 | * | 9/2002 | Quan et al. | 710/243 |
| 2005/0125580 A1 | * | 6/2005 | Madukkarumukumana et al. | 710/200 |
| 2010/0274940 A1 | * | 10/2010 | Ahmad et al. | 710/267 |

* cited by examiner

*Primary Examiner* — Glenn A Auve
(74) *Attorney, Agent, or Firm* — Winston Hsu; Scott Margo

(57) ABSTRACT

An interrupt controller coupled to a plurality of processors is provided to rout at least one interrupt request event to at least one of the processors. The interrupt controller includes a receiving circuit and a controlling circuit. The receiving circuit receives at least one interrupt input, and the controlling circuit, generates the at least one interrupt request event based on the received at least one interrupt input and routes the at least one interrupt request event generated to the at least one of the processors. The plurality of processors including at least a first processor and a second processor, the first and second processors arranged to process interrupt request event(s), and the controlling circuit is arranged to withdraw/cancel assertion of an interrupt request event that has been transmitted to the first processor.

29 Claims, 7 Drawing Sheets

| INT_INPUT | Interrupt controller→Processor |
| --- | --- |
| INT_REQ | Interrupt controller→Processor |
| INT_BACKOFF | Interrupt controller→Processor |
| INT_PREREQ | Interrupt controller→Processor |
| INT_URGENCY | Interrupt controller→Processor |
| INT_BUSY | Processor→Interrupt controller |
| INT_ACK | Processor→Interrupt controller |
| INT_URGENCY | Processor→Interrupt controller |

FIG. 2

INTERRUPT CONTROLLER, APPARATUS INCLUDING INTERRUPT CONTROLLER, AND CORRESPONDING METHODS FOR PROCESSING INTERRUPT REQUEST EVENT(S) IN SYSTEM INCLUDING PROCESSOR(S)

BACKGROUND OF THE INVENTION

1. Field of the Invention

The present invention relates to an interrupt routing scheme, and more particularly to an interrupt controller, an apparatus including the interrupt controller and processor(s), and corresponding methods for processing interrupt request event(s) in a system.

2. Description of the Prior Art

For a system having multiple processors (also called microprocessors), issuing an interrupt request event to one of the processors is typically required in order to perform a service routine. When an interrupt request event is received by the processor whilst it is executing a main process, the processor will temporarily interrupt the main process under execution, and then execute the Interrupt Service Routine (ISR) specified by the interrupt request event corresponding to an interrupt input. In the system, interrupt inputs may be generated by multiple sources; since one processor cannot simultaneously execute multiple ISRs corresponding to the plurality of interrupt inputs, an interrupt controller is provided for receiving the various interrupt inputs, and routing the interrupt inputs to one or more of the processors. Currently developed routing schemes, however, cannot achieve a better and stable performance of the whole system under critical conditions when the processors become busy or unavailable during a specific time period.

SUMMARY OF THE INVENTION

It is therefore one of the objectives of the present invention to provide an interrupt controller, an apparatus including the interrupt controller and at least one processor, and corresponding methods to solve the above-mentioned problem and improve the performance and stability of the whole system.

According to embodiments of the present invention, an interrupt controller which is coupled to a plurality of processors and utilized for routing at least one interrupt request event to at least one of the processors is provided. The interrupt controller comprises a receiving circuit and a controlling circuit. The receiving circuit is utilized for receiving at least one interrupt input, and the controlling circuit coupled to the receiving circuit is utilized for generating at least one interrupt request event based on the received interrupt input and routing the interrupt request event generated to at least one of the processors. In addition, the plurality of processors includes at least a first processor and a second processor, and at least the first and second processors are utilized for processing interrupt request event(s). The controlling circuit is arranged to withdraw/cancel assertion of an interrupt request event that has been transmitted to the first processor.

According to embodiments of the present invention, an interrupt controller which is coupled to a plurality of processors and utilized for routing at least one interrupt request event to at least one of the processors is provided. The interrupt controller comprises a receiving circuit and a controlling circuit. The receiving circuit is utilized for receiving at least one interrupt input, and the controlling circuit coupled to the receiving circuit is utilized for generating at least one interrupt request event based on the received interrupt input and routing the interrupt request event generated to at least one of the processors. In addition, the plurality of processors includes at least a first processor and a second processor, and at least the first and second processors are utilized for processing interrupt request event(s). The controlling circuit is arranged to send an interrupt request event to the plurality of processors according to weighting values that respectively correspond to the processors.

According to embodiments of the present invention, an interrupt controller which is coupled to a plurality of processors and utilized for routing at least one interrupt request event to at least one of the processors is provided. The interrupt controller comprises a receiving circuit and a controlling circuit. The receiving circuit is utilized for receiving at least one interrupt input, and the controlling circuit coupled to the receiving circuit is utilized for generating at least one interrupt request event based on the received interrupt input and routing the interrupt request event generated to at least one of the processors. In addition, the plurality of processors includes at least a first processor and a second processor, and at least the first and second processors are utilized for processing interrupt request event(s). Before sending an interrupt request event, the controlling circuit is arranged to send pre-request events to the plurality of processors by asserting interrupt pre-request signals along with same interrupt vector number for inquiring if each of the plurality of processors is able to accept the interrupt request event.

According to embodiments of the present invention, an interrupt controller which is coupled to a plurality of processors and utilized for routing at least one interrupt request event to at least one of the processors is provided. The interrupt controller comprises a receiving circuit and a controlling circuit. The receiving circuit is utilized for receiving at least one interrupt input, and the controlling circuit coupled to the receiving circuit is utilized for generating at least one interrupt request event based on the received interrupt input and routing the interrupt request event generated to at least one of the processors. In addition, the plurality of processors includes at least a first processor and a second processor, and at least the first and second processors are utilized for processing interrupt request event(s). The controlling circuit is implemented with a bunch of rate control logics to generate rate indices for the receiving circuit to dynamically adjust urgency levels for associated interrupt inputs.

According to embodiments of the present invention, an interrupt controller which is coupled to a plurality of processors and utilized for routing at least one interrupt request event to at least one of the processors is provided. The interrupt controller comprises a receiving circuit and a controlling circuit. The receiving circuit is utilized for receiving at least one interrupt input, and the controlling circuit coupled to the receiving circuit is utilized for generating at least one interrupt request event based on the received interrupt input and routing the interrupt request event generated to at least one of the processors. In addition, the plurality of processors includes at least a first processor and a second processor, and at least the first and second processors are utilized for processing interrupt request event(s). The controlling circuit is arranged to employ a time-division manner to generate and route one interrupt request event to one processor included within the plurality of processors during one arbitration at a time, and generate and route another interrupt request event to another processor included within the plurality of processors during another arbitration at another time.

According to the embodiments of the present invention, a method for processing the interrupt request event in a system having a plurality of processors is provided. The method comprises: receiving at least one interrupt input; generating at least one interrupt request event based on the received interrupt input; routing the interrupt request event generated to at least one of the processors; and withdrawing/canceling assertion of an interrupt request event that has been transmitted to a first processor; wherein the plurality of processors include at least the first processor and a second processor, and at least the first and second processors are utilized for processing interrupt request event(s).

According to the embodiments of the present invention, a method for processing the interrupt request event in a system having a plurality of processors is provided. The method comprises: receiving at least one interrupt input; generating at least one interrupt request event based on the received interrupt input; routing the interrupt request event generated to at least one of the processors; and sending an interrupt request event to the plurality of processors according to weighting values that respectively correspond to the processors; wherein the plurality of processors include at least the first processor and a second processor, and at least the first and second processors are utilized for processing interrupt request event(s).

According to the embodiments of the present invention, a method for processing the interrupt request event in a system having a plurality of processors is provided. The method comprises: receiving at least one interrupt input; generating at least one interrupt request event based on the received interrupt input; routing the interrupt request event generated to at least one of the processors; and before sending an interrupt request event, sending pre-request events to the plurality of processors by asserting interrupt pre-request signals along with same interrupt vector number for inquiring if each of the plurality of processors is able to accept the interrupt request event; wherein the plurality of processors include at least the first processor and a second processor, and at least the first and second processors are utilized for processing interrupt request event(s).

according to the embodiments of the present invention, a method for processing the interrupt request event in a system having a plurality of processors is provided. The method comprises: receiving at least one interrupt input; generating at least one interrupt request event based on the received interrupt input; routing the interrupt request event generated to at least one of the processors; and dynamically adjusting an urgency level of that interrupt request event; wherein the plurality of processors include at least the first processor and a second processor, and at least the first and second processors are utilized for processing interrupt request event(s). Rate indices are generated for dynamically adjusting urgency levels for associated interrupt inputs.

According to the embodiments of the present invention, a method for processing the interrupt request event in a system having a plurality of processors is provided. The method comprises: receiving at least one interrupt input; generating at least one interrupt request event based on the received interrupt input; routing the interrupt request event generated to at least one of the processors; employing a time-division manner to generate and route one interrupt request event to one processor included within the plurality of processors during one arbitration at a time; and generating and routing another interrupt request event to another processor included within the plurality of processors during another arbitration at another time; wherein the plurality of processors include at least the first processor and a second processor, and at least the first and second processors are utilized for processing interrupt request event(s).

Further, according to the embodiments of the present invention, an apparatus that comprises one of the above-mentioned interrupt controllers and is used for processing at least one interrupt input in a system having a plurality of processors is provided. The apparatuses may also include multiple processors.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram of a table illustrating functions of different signals included within a signal interface between the interrupt controller shown in FIG. 1 and a processor.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
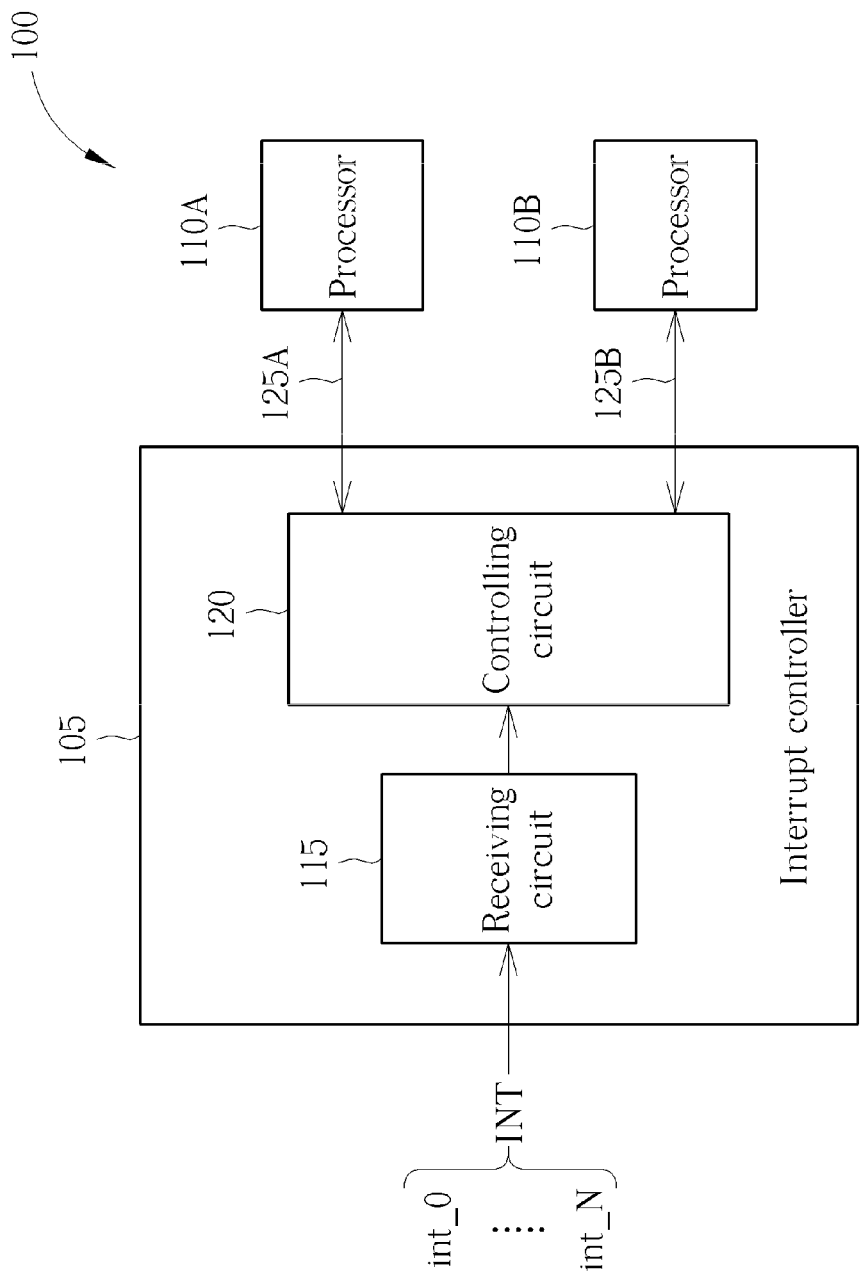
FIG. 1 is a block diagram of an apparatus for processing at least one interrupt input INT (including at least one of interrupt inputs int_0, int_1, int_2, . . . , and int_N) in a system having a plurality of processors according to embodiments of the present invention.

Please refer to FIG. 1, which illustrates a block diagram of an apparatus 100 for processing at least one interrupt input INT (including at least one of interrupt inputs int_0, int_1, int_2, . . . , and int_N) in a system having a plurality of processors according to embodiments of the present invention. The interrupt inputs int_0, int_1, int_2, . . . , and int_N are a variety of interrupt sources that may be generated by different electronic circuit elements/devices. Herein, it is assumed that the interrupt sources are represented by interrupt vectors; when an interrupt input is chosen to be an interrupt request event sending to a processor, its corresponding vector number is sent to the processor through the signal interface. However, this is not intended to be a limitation of the present invention. The apparatus 100 comprises an interrupt controller 105 and a plurality of processors such as 110A and 110B, and is used to execute a scalable multi-core interrupt routing scheme. This indicates that the apparatus 100 can route interrupt input(s) for multiple processors wherein the number of the processors can be scalable. The processors 110A and 110B can be microprocessors (or can be referred to as data processing engines) and configured to process/serve interrupt input(s) corresponding to interrupt request event(s) transferred by the interrupt controller 105. The processors 110A and 110B are illustrated in FIG. 1; however, the number of the processors illustrated is not meant to be a limitation of the present invention. In another implementation, the apparatus 100 may include only one processor or include more than two processors.

The interrupt controller 105 comprises a receiving circuit 115 and a controlling circuit 120. The receiving circuit 115 is utilized for receiving the interrupt input INT, and the controlling circuit 120 is coupled to the receiving circuit 115 and utilized for generating at least one interrupt request event based on the received interrupt input INT and then routing the generated interrupt request event to one or more processors. For one of the processors, the processor can determine whether to accept or reject the interrupt request event transmitted by the interrupt controller 105. The processor can also choose to ignore the transmitted interrupt request event. Once the transmitted interrupt request event is accepted by the processor, the processor is trapped into an interrupt handler to serve the interrupt input corresponding to the interrupt request event. The interrupt input INT corresponding to the interrupt request event is appropriately/correctly served by the processor. The interrupt controller 105 can also provide a programming interface with a variety of programming registers for system software to choose proper schemes of interrupt sampling, scheduling, arbitrating, and routing. In addition, the interrupt controller 105 is arranged to communicate with one or more processors such as the processors 110A and 110B such that one processor can serve an interrupt input as soon as possible.

In the provided embodiments, a signal interface between the interrupt controller 105 and each of the processors includes a set of signals: INT_INPUT, INT_REQ, INT_BACKOFF, INT_PREREQ, INT_URGENCY, INT_BUSY, INT_ACK, and PROC_URGENCY. When an assertion of a signal occurs, this indicates that a signal port corresponding to the signal is being used by one of the interrupt controller 105 and a processor to notify/send information to the other. When a de-assertion of the signal occurs, this indicates that the operation of notifying/sending information by one of the interrupt controller 105 and a processor to the other is finished. The interrupt controller 105 and each processor communicate with each other via the set of signals. Different signals included within the signal interface include different functions; these will be explained later. In addition, it should be noted that the set of signals mentioned above in other examples may be called by using different names or notations. These examples still fall within the scope of the present invention.

Please refer to FIG. 2. FIG. 2 is a diagram of a table illustrating functions of different signals included within a signal interface between the interrupt controller 105 and a processor. The signals INT_INPUT, INT_REQ, INT_BACKOFF, INT_PREREQ, INT_URGENCY are used by the interrupt controller 105 to generate and transmit information to one corresponding processor so as to send information to the processor or notify the processor. In addition, the signals INT_BUSY, INT_ACK, and PROC_URGENCY are used by a processor rather than the interrupt controller 105 to generate and transmit information to the interrupt controller 105 so as to send information to the interrupt controller 105 or notify/reply to the interrupt controller 105. By this kind of information handshaking negotiation process, the interrupt controller 105 can effectively communicate with each processor to exchange mutual information. In practice, such information handshaking negotiation process (may be also referred as to an inter-lockable handshaking process) works well for variety of implementations of a system with mentioned processors and an interrupt controller when both can operate according to some synchronous clock signals or some asynchronous clock signals. In addition, the signals are used in embodiment of the present invention to indicate that this process can work well regardless clock relationship between processors and the interrupt controller.

Function of the signal INT_INPUT represents that the interrupt request event is generated based on the interrupt input INT, and the signal INT_INPUT corresponds to one or more than one interrupt input source int_0, int_1, int_2, . . . , and int_N. In addition, the signal INT_INPUT can also represent the vector number of the generated interrupt request event that maps to one of the interrupt input sources int_0, int_1, int_2, . . . , and int_N. Function of the signal INT_REQ is used by the interrupt controller 105 to notify one processor such as the processor 110A that an interrupt request event occurs when the signal INT_REQ is asserted. Function of the signal INT_BACKOFF is used by the interrupt controller 105 to notify one processor of withdrawing or cancelling of the interrupt request event that was previously sent to the processor. Function of the signal INT_PREREQ is used by the interrupt controller 105 together with the signal INT_INPUT to ask one processor whether the processor is able to serve an interrupt input corresponding to an interrupt request event when the signal INT_PREREQ is asserted. Function of the signal INT_URGENCY is used by the interrupt controller 105 to inform one processor of the urgency level of the interrupt request event. Additionally, function of the signal INT_BUSY is used by a processor to inform the interrupt controller 105 that the processor is temporarily busy and not able to serve an interrupt input corresponding to a new interrupt request event when the signal INT_BUSY is asserted. In addition, the signal INT_BUSY can also be used by the processor to reject an interrupt request event transmitted by the interrupt controller 105; this will be explained later. Function of the signal INT_ACK is used by a processor to inform the interrupt controller 105 that a current interrupt request event sent by the interrupt controller 105 is accepted by the processor itself and the processor is then trapped into an interrupt handler to serve the interrupt input corresponding to the interrupt request event. This indicates that an interrupt input corresponding to such an interrupt request event is appropriately routed to an available processor, and the interrupt input can be served. Function of the signal PROC_URGENCY is used by a processor to inform the interrupt controller 105 of an urgency level of an interrupt input currently processed/served by the processor itself.

It should be noted that, in the embodiments of the present invention, the communication interface (or signal interface) between the interrupt controller 105 and each processor is arranged to transfer interrupt request events with corresponding vector numbers on the INT_INPUT signal. This is not, however, intended to be a limitation of the present invention. In another embodiment, the communication interface can also be used to transfer interrupt request events with each pin of the INT_INPUT signal to represent one or more of interrupt inputs. The apparatus 100 and the interrupt controller 105 can be applied to resolve/process the interrupt inputs whether in either of the aforementioned usages of the communication interface.

In the following embodiments of the present invention, the communication between the interrupt controller 105 and one or more processors is detailed. In a first embodiment of the present invention, the controlling circuit 120 is able to determine whether to withdraw/cancel assertion of an interrupt request event that has been transmitted to a processor such as the processor 110A, and asserts the signal INT_BACKOFF if the controlling circuit 120 determines to withdraw/cancel an interrupt request event. The processor 110A can confirm whether to withdraw/cancel the transmitted interrupt request event after observing cancellation of the transmitted interrupt request event, and notify the interrupt controller 105 of a confirmed result.

Figure 3A:
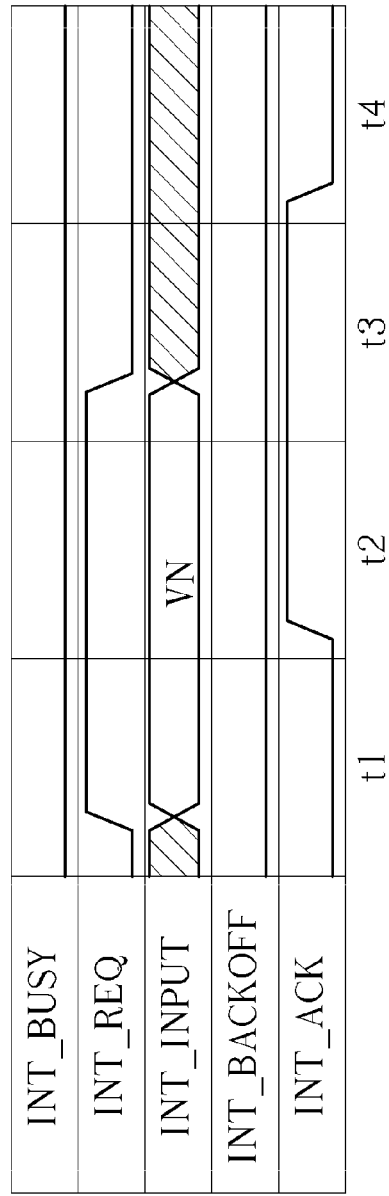
FIG. 3A is a timing diagram illustrating an operation of a processor accepting an interrupt request event sent by the interrupt controller shown in FIG. 1 according to the first embodiment of the present invention.
Figure 3B:
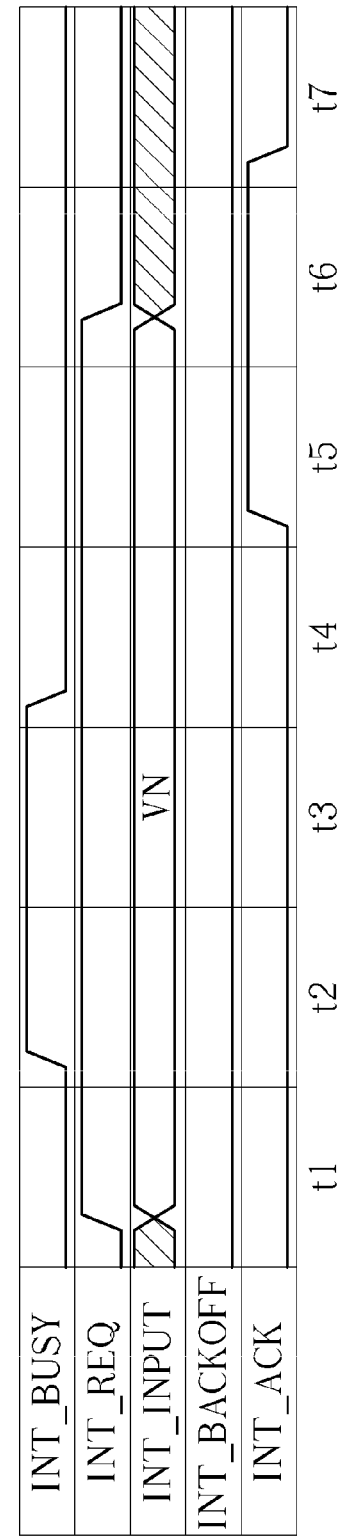
FIG. 3B is a timing diagram illustrating an operation of a processor accepting an interrupt request event sent by the interrupt controller shown in FIG. 1 after the signal INT_BUSY is de-asserted according to the first embodiment of the present invention.

Please refer to FIG. 3A in conjunction with FIG. 3B. FIG. 3A is a timing diagram illustrating an operation of a processor accepting an interrupt request event sent by the interrupt controller 105 according to the first embodiment of the present invention. FIG. 3B is a timing diagram illustrating an operation of a processor accepting an interrupt request event sent by the interrupt controller 105 after the signal INT_BUSY is de-asserted according to the first embodiment of the present invention. As shown in FIG. 3A, at clock cycle t1, the interrupt controller 105 asserts the signal INT_REQ to notify a processor such as 110A of an incoming interrupt request event. At clock cycle t1, the interrupt controller 105 also uses the signal INT_INPUT to inform the processor 110A of a vector number VN corresponding to the transmitted interrupt request event. The processor 110A accepts the interrupt request event and would like to be trapped into its interrupt handler to serve the interrupt input corresponding to the interrupt request event after observing the assertion of the signal INT_REQ. Accordingly, the processor 110A asserts the signal INT_ACK at clock cycle t2 to notify the interrupt controller 105 that this interrupt request event has been accepted by the processor 110A. The processor 110A is arranged to send an acknowledgement indication through the INT_ACK signal to the interrupt controller 105 for indicating that the transmitted interrupt request event is accepted by the processor 110A. After observing the assertion of the signal INT_ACK, the interrupt controller 105 de-asserts the signal INT_REQ at clock cycle t3. The processor 110A then de-asserts the signal INT_ACK at the clock cycle t4 after observing the de-assertion of the signal INT_REQ. In this example shown in FIG. 3A, the processor 110A is available to accept new interrupt request event at clock cycle t1 and the signal INT_BUSY is not asserted before asserting INT_ACK signal at clock cycle t2. In addition, the interrupt controller 105 does not withdraw/cancel the interrupt request event transmitted to the processor 110A, so the signal INT_BACKOFF is not asserted before observing the assertion of INT_ACK signal at clock cycle t2.

In another example, as shown in FIG. 3B, at clock cycle t1 the interrupt controller 105 asserts the signal INT_REQ to notify a processor such as 110A of an incoming interrupt request event. In addition, the interrupt controller 105 uses the signal INT_INPUT to inform the processor 110A of a vector number VN corresponding to the transmitted interrupt request event at clock cycle t1. The processor 110A then enters into a busy state unexpectedly and is temporarily unable to serve an interrupt input, so the processor 110A asserts the signal INT_BUSY at clock cycle t2. The processor 110A is arranged to send a busy indication through the INT_BUSY signal to the interrupt controller 105 for indicating that the processor 110A is not able to accept the transmitted interrupt request event during the assertion of the INT_BUSY signal. After observing the assertion of the signal INT_BUSY, the interrupt controller 105 would like to wait for the processor 110A to eventually accept the interrupt request event instead of withdrawing/canceling the request, and hence the signal INT_BACKOFF is not asserted by the interrupt controller 105 during the assertion period of INT_BUSY signal between clock cycle t2 and t4.

After one or several clock cycles, the processor 110A becomes available and is able to serve an interrupt input immediately, so the processor 110A de-asserts the signal INT_BUSY at clock cycle t4, in order to accept the interrupt request event, and then asserts the signal INT_ACK at clock cycle t5 to notify the interrupt controller 105 that this interrupt request event has been accepted by the processor 110A. After observing the assertion of the signal INT_ACK, the interrupt controller 105 de-asserts the signal INT_REQ at clock cycle t6. The processor 110A then de-asserts the signal INT_ACK at the clock cycle t7 after observing the de-assertion of the signal INT_REQ. In this example shown in FIG. 3B, the interrupt controller 105 waits for the processor 110A and does not withdraw/cancel the interrupt request event transmitted to the processor 110A, so the signal INT_BACKOFF is not asserted during the assertion period of INT_BUSY signal between clock cycle t2 and t4.

Figure 3C:
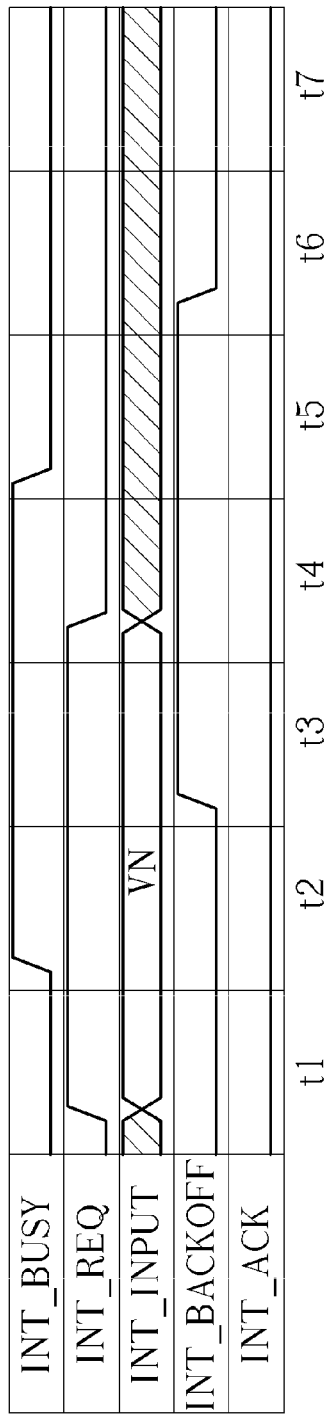
FIG. 3C and FIG. 3D are timing diagrams respectively illustrating an operation of the interrupt controller shown in FIG. 1 withdrawing/canceling an interrupt request event transmitted to a processor according to the first embodiment of the present invention.
Figure 3D:
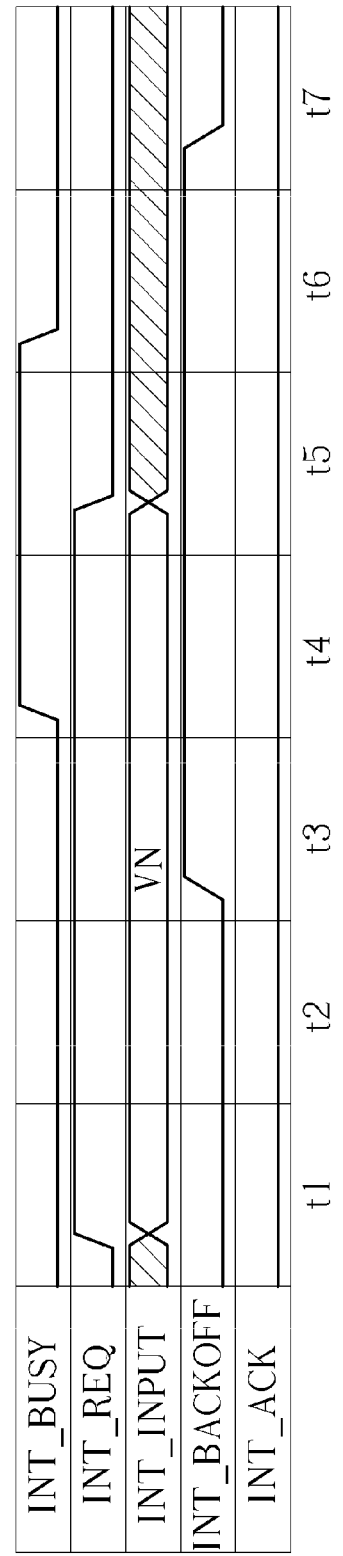

Please refer to FIG. 3C in conjunction with FIG. 3D. FIG. 3C and FIG. 3D are timing diagrams respectively illustrating an operation of the interrupt controller 105 withdrawing or canceling an interrupt request event transmitted to a processor according to the first embodiment of the present invention. As shown in FIG. 3C, at clock cycle t1, the interrupt controller 105 asserts the signal INT_REQ to notify a processor such as 110A of an incoming interrupt request event. In addition, the interrupt controller 105 uses the signal INT_INPUT to inform the processor 110A a vector number VN corresponding to the transmitted interrupt request event at clock cycle t1. The processor 110A then enters into a busy state unexpectedly and is temporarily unable to serve an interrupt input, so the processor 110A asserts the signal INT_BUSY at clock cycle t2. The processor 110A is arranged to send a busy indication through the INT_BUSY signal to the interrupt controller 105 for indicating that the processor 110A is not able to accept the transmitted interrupt request event during the assertion of the INT_BUSY signal. After observing the assertion of the signal INT_BUSY, the interrupt controller 105 would like to cancel the interrupt request event transmitted to the processor 110A, and thus it asserts the signal INT_BACKOFF at clock cycle t3 to cancel the interrupt request event. Since the signals INT_BACKOFF and INT_BUSY are asserted at clock cycle t3, the interrupt controller 105 can determine that the processor 110A now is unavailable and unable to serve an interrupt input corresponding to an interrupt request event immediately. Accordingly, the interrupt controller 105 then de-asserts the signal INT_REQ at clock cycle t4. The processor 110A then recognizes withdrawing/canceling of the interrupt request event by de-asserting the signal INT_BUSY at clock cycle t5. Afterward, the signal INT_BACKOFF is de-asserted by the interrupt controller 105 at clock cycle t6 to complete the withdrawing/canceling sequence.

In another example, as shown in FIG. 3D, at clock cycle t1, the interrupt controller 105 asserts the signal INT_REQ to notify a processor such as 110A of an incoming interrupt request event. In addition, the interrupt controller 105 uses the signal INT_INPUT to inform the processor 110A of a vector number VN corresponding to the transmitted interrupt request event at clock cycle t1. In this example, a processor can enter into a busy state without notifying the interrupt controller 105. Even though the signal INT_BUSY is not asserted, the processor 110A may be busy and temporarily unable to serve an interrupt request input though it doesn't indicate such condition by asserting the INT_BUSY signal. The interrupt controller 105 then determines to withdraw/cancel the interrupt request event sent to the processor 110A after a while of not been served, by asserting the signal INT_BACKOFF at clock cycle t3.

After observing the assertion of the signal INT_BACKOFF, the processor 110A can still determine whether to accept, ignore, or reject the withdrawal or cancellation of the interrupt request event. In this example, the processor 110A determines to accept the withdrawal or cancellation of the interrupt request event, and hence asserts the signal INT_BUSY at clock cycle t4 to inform the interrupt controller 105 that the interrupt request event is rejected or not accepted by the processor 110A and withdrawal or cancellation of the interrupt request event is accepted. After observing the assertion of the signal INT_BUSY, the interrupt controller 105 knows that the withdrawal or cancellation of the interrupt request event is accepted by the processor 110A, and then de-asserts the signal INT_REQ at clock cycle t5. Since in this example the signal INT_BUSY is used by the processor 110A to notify the interrupt controller 105 of acceptance or withdrawal of the interrupt request event, the processor 110A is arranged to de-assert the signal INT_BUSY after observing the de-assertion of the signal INT_REQ at clock cycle t6. The signal INT_BACKOFF is then de-asserted by the interrupt controller 105 at clock cycle t7.

Figure 3E:
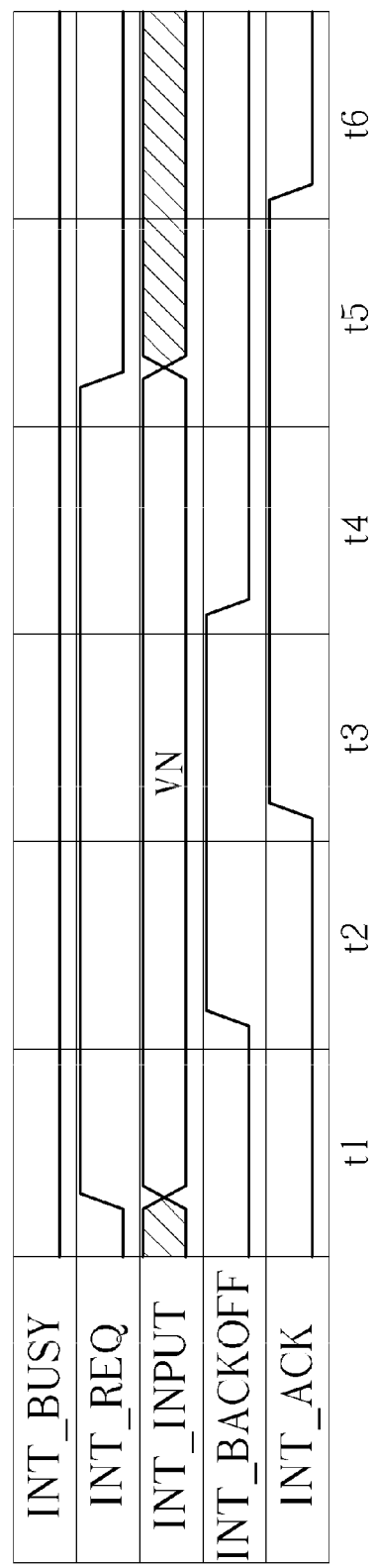
FIG. 3E is a timing diagram illustrating an operation of a processor rejecting a withdrawal or cancellation of an interrupt request event transmitted by the interrupt controller shown in FIG. 1 according to the first embodiment of the present invention.

Please refer to FIG. 3E. FIG. 3E is a timing diagram illustrating an operation that a processor rejects a withdrawal or cancellation of an interrupt request event transmitted by the interrupt controller 105 according to the first embodiment of the present invention. As shown in FIG. 3E, at clock cycle t1, the interrupt controller 105 asserts the signal INT_REQ to notify a processor such as 110A of an incoming interrupt request event. In addition, the interrupt controller 105 uses the signal INT_INPUT to inform the processor 110A of a vector number VN corresponding to the transmitted interrupt request event at clock cycle t1. In this example, after sending the interrupt request event to the processor 110A, the interrupt controller 105 would like to transmit the interrupt request event to another processor such as 110B instead of the processor 110A, since the interrupt controller 105 may consider that the processor 110B is more suitable for resolving the interrupt request event than the processor 110A. Thus, the interrupt controller 105 would like to withdraw/cancel the interrupt request event that has been transmitted to the processor 110A by asserting the signal INT_BACKOFF at clock cycle t2.

The processor 110A can determine whether to accept the withdrawal/cancellation requested by the interrupt controller 105 or not after observing the assertion of the signal INT_BACKOFF. In this example, the processor 110a determines to reject the withdrawal/cancellation requested by the interrupt controller 105. In other words, the processor 110A would like to accept the interrupt request event previously transmitted by the interrupt controller 105. The processor 110A asserts the signal INT_ACK at clock cycle t3 to notify the interrupt controller 105 of an acceptance of the interrupt request event. After observing the assertion of the signal INT_ACK, the interrupt controller 105 knows that the withdrawal/cancellation requested by the interrupt controller 105 fails, and the interrupt controller 105 then de-asserts the signal INT_BACKOFF at clock cycle t4.

After de-asserting the signal INT_BACKOFF, the interrupt controller 105 is arranged to complete the interrupt request event by de-asserting the signal INT_REQ at clock cycle t5. After observing the de-assertion of the signal INT_REQ, the processor 110A knows that the process of an interrupt request event has been completed, and then de-asserts the signal INT_ACK at clock cycle t6. In the example shown in FIG. 3E, the processor 110A determines to accept the interrupt request event previously transmitted by the interrupt controller 105 after observing the assertion of the signal INT_BACKOFF. In another example, the processor 110A can determine to accept the interrupt request event previously transmitted by the interrupt controller 105 without observing the assertion of the signal INT_BACKOFF. This also obeys the spirit of the present invention.

The interrupt controller 105 may assert the signal INT_BACKOFF to withdraw/cancel the assertion of the signal INT_REQ for the following reasons: after sending an interrupt request event to the processor 110A, the interrupt controller 105 detects another interrupt input having higher priority than that of the interrupt request event transmitted. In this situation, the interrupt controller 105 considers that the interrupt input having the higher priority should be served by the processor 110A immediately. The interrupt controller 105 is arranged to withdraw/cancel the interrupt request event that is previously transmitted to the processor 110A. In another example, the interrupt controller 105 may consider/determine that the whole performance can be raised if the interrupt request event previously transmitted to the processor 110A is cancelled and then routed to another processor such as the processor 110B. Accordingly, the interrupt controller 105 would like to withdraw/cancel the interrupt request event that is previously transmitted to the processor 110A. The above-mentioned examples fall within the scope of the present invention.

According to a second embodiment of the present invention, the interrupt controller 105 coupled to a plurality of processors such as 110A and 110B is utilized for routing at least one interrupt request event to at least one of the processors 110A and 110B. The receiving circuit 115 is arranged to receive at least one interrupt input INT, and the controlling circuit 120 is coupled to the receiving circuit 115 and used for generating the interrupt request event based on the received interrupt input INT and routing the interrupt request event generated to at least one of the processors 110A and 110B. The processors 110A and 110B are utilized for processing interrupt request event(s). The interrupt controller 105 includes a function of programmable interrupt routing and can route an interrupt input to a set of processors or route an interrupt input for a specific processor. In an example of the second embodiment, each interrupt input INT received by the receiving circuit 115 of the interrupt controller 105 is programmed by the controlling circuit 120 to route to a set of processors (may include the processors 110A and 110B) that are coupled or attached to the interrupt controller 105. In addition, an interrupt input INT received by the receiving circuit 115 can also be programmed by the controlling circuit 120 to route to only one processor. This is not a limitation of the present invention.

It should be noted that the interrupt controller 105 includes three programmable interrupt routing schemes including a preferred routing scheme, a balanced routing scheme, and a pre-request routing scheme. For the preferred routing scheme, the controlling circuit 120 of the interrupt controller 105 determines that each interrupt input to be routed is assigned to a pre-determined corresponding processor for service. Thus, when the receiving circuit 115 receives an interrupt input INT, the controlling circuit 120 is arranged to always route an interrupt request event derived from the interrupt input to a certain processor such as the processor 110A when the processor 110A is available.

For the balanced routing scheme, weighting values are maintained by the controlling circuit 120 for processors. Each weighting value is associated to a processor to represent a reference time which may be spent by the processor for serving one interrupt or a reference number of interrupts which may be served by the processor within a period of time, for those interrupt inputs programmed to be routed in balance routing scheme. The weighting values are generated by the controlling circuit 120, by referring to respective average loadings of the set of processors. The controlling circuit 120 further calculates an average loading value for each processor participating in the balance routing scheme in accordance with the ratio of the actual time which the processor has spent to serve one interrupt or the actual number of interrupts that have been served by the processor within a period of time, for those interrupt inputs programmed to be routed in the balance routing scheme. If a processor's average loading value is big, it may indicate a weak possibility for the processor to serve an interrupt input which may be issued to the processor timely, even though the processor is not busy and is able to accept some interrupt request event. Instead, if the average loading value of a processor is small, it may indicate a strong possibility for the processor to serve an interrupt input which may be issued to the processor efficiently. In some other embodiments, the controlling circuit 120 may further adjust weighting values of the processors in the balance routing scheme dynamically, depending on how soon the processors may accept interrupt request events. For example, if a processor is busy and not able to accept an interrupt request event routed to it by the controlling circuit 120 for longer time, the controlling circuit 120 may be arranged to lower the weighting value corresponding to the processor. On the other hand, if a processor is available to accept an interrupt request event routed to it by the controlling circuit 120 immediately, then the controlling circuit 120 may be arranged to escalate the weighting value corresponding to the processor. Accordingly, a processor having a greater weighting value indicates that the processor can serve more interrupt inputs within a period of time. A processor having a smaller weighting value indicates that the processor can serve few interrupt inputs within the period of time. Different weighting values also indicate different probabilities that corresponding processors can accept the interrupt request event and serve the interrupt input.

Figure 4:
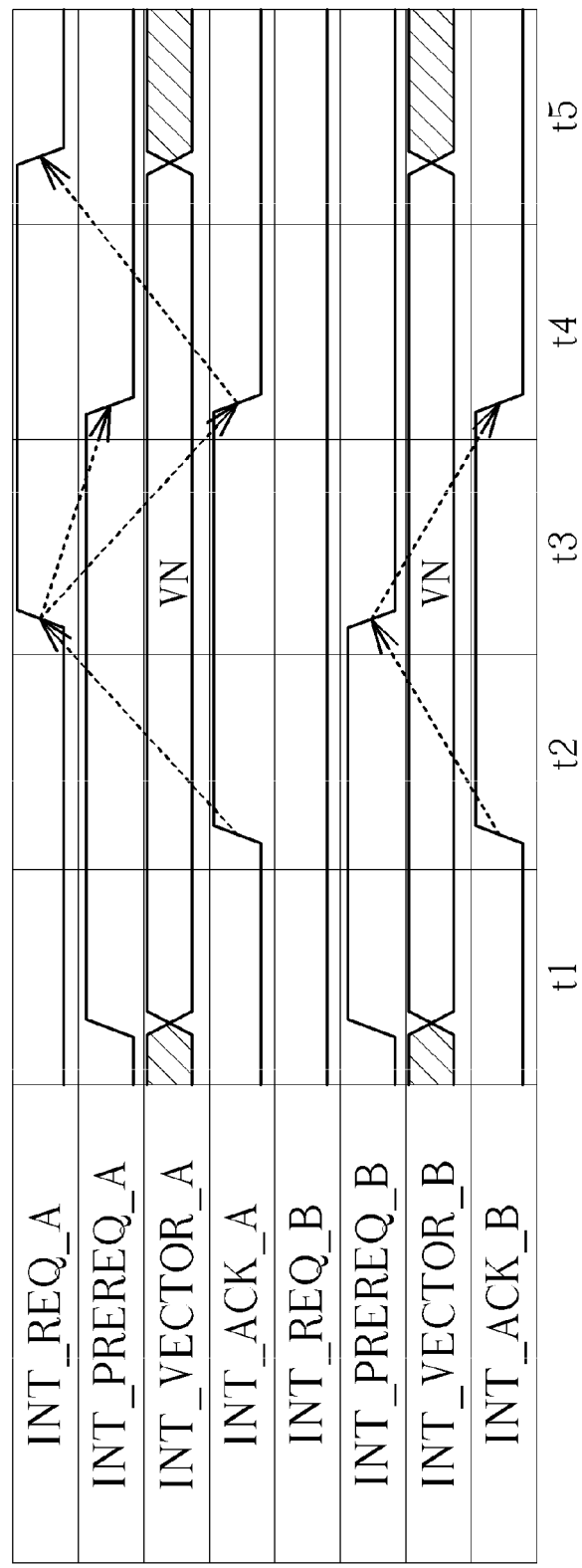
FIG. 4 is a timing diagram illustrating an operation of the interrupt controller shown in FIG. 1 sending interrupt pre-request events to the processors along with same interrupt vector number for inquiring if each of the processors can serve an interrupt input according to a second embodiment of the present invention.

For the pre-request routing scheme, the controlling circuit 120 is arranged to send pre-request events to the plurality of processors such as the processor 110A and 110B by asserting interrupt pre-request signals INT_PREREQ along with same interrupt vector number VN on INT_INPUT for inquiring if each of the plurality of processors 110A and 110B is able to accept the interrupt request event. Please refer to FIG. 4, which is a timing diagram illustrating an operation of the interrupt controller 105 sending interrupt pre-request events to the processors 110A and 110B along with same interrupt vector number VN for inquiring if each of the processors 110A and 110B can serve the interrupt request event. As shown in FIG. 4, the controlling circuit 120 sends an interrupt pre-request event to the processors 110A and 110B for inquiring which of the processors 110A and 110B is able to accept and serve the interrupt request event in advance. Accordingly, the controlling circuit 120 is arranged to respectively send an interrupt pre-request event to the processors 110A and 110B by respectively asserting the INT_PREREQ signals (i.e. INT_PREREQ_A and INT_PREREQ_B) together with same vector number VN on corresponding INT_INPUT signals included within the corresponding communication interfaces at clock cycle t1.

In a scenario, both the processors 110A and 110B would like to notify the interrupt controller 105 of an available state (i.e. non-busy), so the processors 110A and 110B reply with acknowledgement indications to the interrupt controller 105 by asserting interrupt acknowledgement signals to indicate that the processors are able to accept/serve the interrupt request event. The processors 110A and 110B respectively assert the signals INT_ACK_A and INT_ACK_B (i.e. the signals INT_ACK) at clock cycle t2. It should be noted that only one processor replying to an acknowledgement indication to the interrupt controller 105 also obeys the spirit of the present invention, if only one processor is available at that time. The above-described example is just one of the scenarios. In another example, the processor 110B may not be available to accept the pre-request event while the processor 110A is available to accept the pre-request event at the same time. In this case, the interrupt controller 105 would confirm the interrupt request event for the processor 110A by completing a handshaking procedure, and would drop the pre-quest event sent to the processor 110B by de-asserting INT_PREREQ_B signal without asserting INT_REQ_B signal. This modification also falls within the scope of the present invention.

After observing the assertion of the signals INT_ACK_A and INT_ACK_B, the controlling circuit 120 knows that the processors 110A and 110B are available and able to accept/serve the interrupt request event immediately. The controlling circuit 120 of the interrupt controller 105 can select one of the processors 110A and 110B, and confirm the interrupt request event to the selected processor. In this embodiment, the controlling circuit 120 selects the processor 110A and then determines to only confirm the interrupt request event to the processor 110A. Accordingly, at clock cycle t3, the controlling circuit 120 asserts the signal INT_REQ_A included within the communication interface corresponding to the processor 110A and de-asserts the signal INT_PREREQ_B included within the signal interface corresponding to the processor 110B.

After observing the de-assertion of the signal INT_PREREQ_B, the processor 110B knows that the interrupt request event is not to be transmitted to the processor 110B. Thus, the processor 110B de-asserts the signal INT_ACK_B included within the signal interface corresponding to the processor 110B at clock cycle t4. The operation of the interrupt controller 105 inquiring the processor 110B is finished. Additionally, for the processor 110A, after observing the assertion of the signal INT_REQ_A, the processor 110A knows that the interrupt request event is to be transmitted to the processor 110A.

In this example, the processor 110A then de-asserts the signal INT_ACK_A, and the interrupt controller 105 de-asserts the signal INT_PREREQ_A, at clock cycle t4. This, however, is merely an example for illustrative purposes. It is not required to de-assert the signals INT_ACK_A and INT_PREREQ_A in the same clock cycle. The pre-request routing scheme still works fine as long as the signal INT_REQ_A is not de-asserted until both the signals INT_ACK_A and INT_PREREQ_A are de-asserted. Further, after de-asserting the signal INT_PREREQ_A and observing the de-assertion of the signal INT_ACK_A, the interrupt controller 105 de-asserts the signal INT_REQ_A at clock cycle t5. The operation of the interrupt controller 105 inquiring the processor 110A is finished.

It should be noted that the controlling circuit 120 of the interrupt controller 105 can send multiple interrupt pre-request events to more than two processors in another embodiment at clock cycle t1. The controlling circuit 120 can withdraw/cancel pre-request events sent to the plurality of processors except for the processor 110A by de-asserting interrupt pre-request signals corresponding to the plurality of processors except of the processor 110A. The interrupt controller 105 is not limited to withdraw/cancel only one pre-request event sent to a certain processor. This also obeys the spirit of the present invention.

According to a third embodiment of the present invention, the controlling circuit 120 is arranged to dynamically adjust an urgency level of the interrupt request event. The controlling circuit 120 further includes a bunch of rate control logics, and each interrupt input received by the receiving circuit 115 is associated to one rate control logic through software programming so as to maintain an expected service rate for interrupt inputs associated to the same rate control logic. Each rate control logic included within the controlling circuit 120 is utilized to generate a rate index based on a pre-programmed expected rate value and frequency of served interrupt request events corresponding to associated interrupt inputs. The generated rate index is utilized by the receiving circuit 115 to adjust urgency level for each associated interrupt input. Initially each rate index may be equal to the same value (usually zero) so that the urgency level of each interrupt input is initially determined according to only its own pre-programmed priority value. This, however, is merely used to be for illustrative purposes and not intended to be a limitation of the present invention. A first urgency level of a first interrupt request event corresponding to a first interrupt input is determined according to the priority value of the first interrupt input and its associated rate index, and a second urgency level of a second interrupt request event corresponding to a second interrupt input is determined according to a priority value of the second interrupt input and its associated rate index, respectively. Thus, the first and second urgency levels can be determined as different levels even though the priorities of the first and second interrupt inputs are the same, if their associated rate indices are different. On the other hand, different priorities of interrupt inputs may correspond to different urgency levels or the same urgency levels.

Suppose that two interrupt inputs with same priority values, e.g. the first and second interrupt inputs, are associated to rate control logics having same expected rate values. The above-mentioned interrupt inputs having the same priority values and same expected rate values ideally are served by processors at the same or a similar frequency, if the controlling circuit 120 arbitrates interrupt inputs solely according to their associated priority values. In practice, the interrupt inputs initially having the same priority values may not be served by the processors at the same or a similar frequency, due to conflict of interrupt inputs and arbitration error. In this embodiment, the controlling circuit 120 is arranged to arbitrate interrupt inputs according to their associated urgency levels, and the controlling circuit 120 may be arranged to adjust the urgency level of an interrupt input if the controlling circuit 120 considers that the interrupt input is not served at the expected rate. In implementation, the controlling circuit 120 calculates a service rate index of a rate control logic, which is associated to one or more interrupt inputs, and then refers to the calculated rate index to determine whether to dynamically adjust the urgency level of the interrupt request events corresponding to the associated interrupt inputs. When the calculated rate index indicates the served frequency for interrupt inputs associated to the rate control logic is lower than expected, the controlling circuit 120 determines to raise the urgency level of the interrupt request events corresponding to the associated interrupt inputs. When the calculated rate index indicates the served frequency for interrupt inputs associated to the rate control logic is higher than expected, the controlling circuit 120 determines to lower the urgency level of the interrupt request events corresponding to the associated interrupt inputs. The urgency level may be associated to the interrupt request event that is currently being served by a processor, such as processor 110A or processor 110B, so that the processor may determine when to take the interrupt request event according to its associated urgency level.

In addition, the controlling circuit 120 is arranged to use the signal INT_URGENCY to inform one processor such as the processor 110A of the urgency level of an interrupt input. The processor 110A is arranged to use the signal PROC_URGENCY to inform the interrupt controller 105 of an urgency level of an interrupt input currently being processed/served by the processor 110A. Accordingly, since the urgency level implies how well an interrupt input has been served according to its associated expected rate, the processor 110A may be arranged to take an urgent interrupt request event as soon as possible if the urgency level indicated by the signal INT_URGENCY is higher than the urgency level indicated by the signal PROC_URGENCY, even though the processor 110A is currently serving another interrupt input or even when the processor 110A is tentatively masking out its interrupt interface.

On the other hand, the controlling circuit 120 may be arranged to favor arbitration to an interrupt input with associated urgency level higher than the urgency level, indicated at the signal PROC_URGENCY, associated to the interrupt request event that is currently served by a processor, which might be the same one as the same interrupt input was served previously, in order to shorten the overall interrupt service latency.

Figure 5:
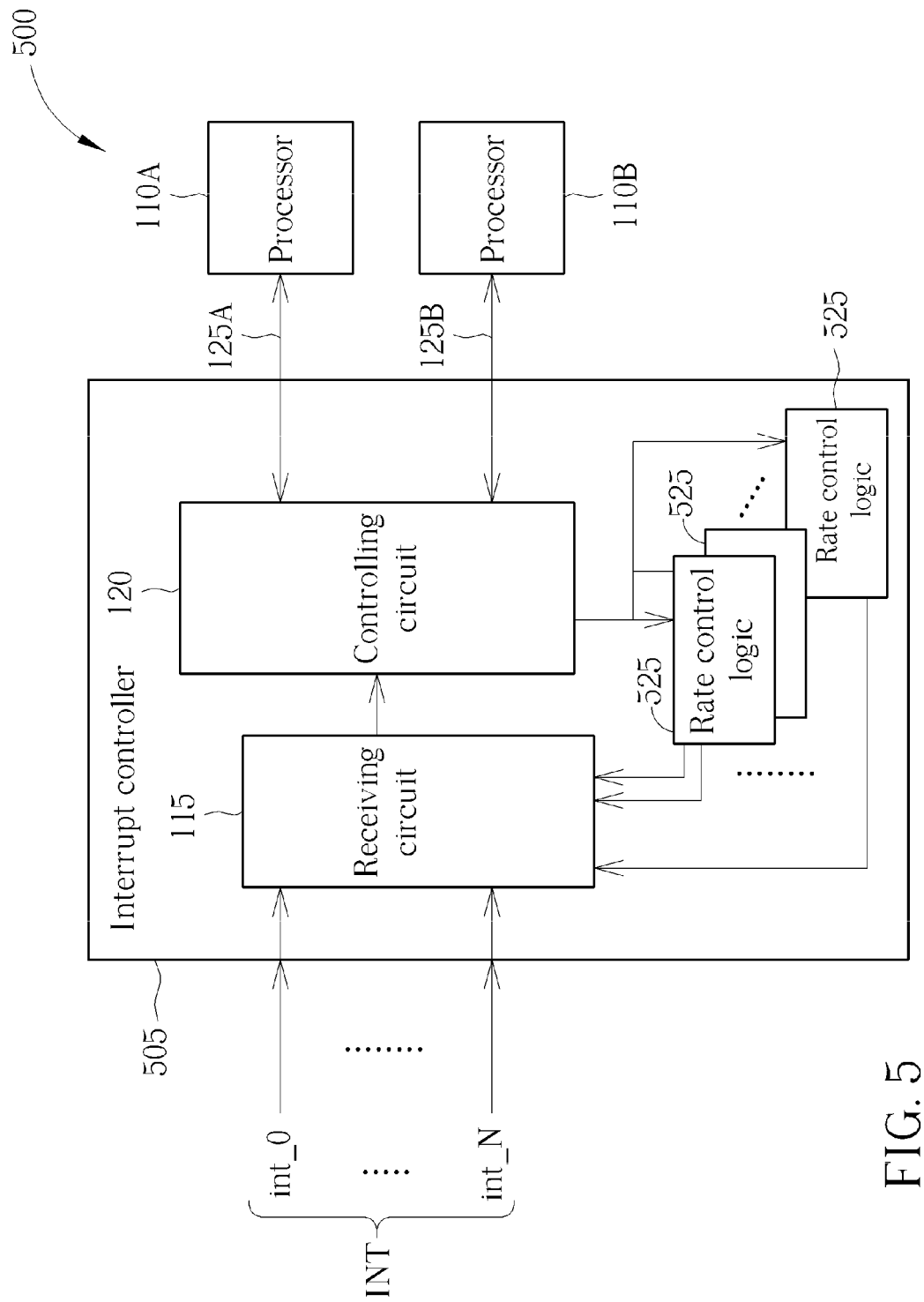
FIG. 5 is a block diagram of a bunch of rate control logics externally coupled to a controlling circuit and included within an interrupt controller according to another embodiment of the present invention.

In addition, in another embodiment, the group of rate control logics mentioned above can be implemented as a set of circuits externally coupled to the controlling circuit 120 and included within an interrupt controller. Please refer to FIG. 5, which is a block diagram of a group of rate control logics 525 externally coupled to the controlling circuit 120 according to another embodiment of the present invention. The operation and function of the interrupt controller 505 is similar to that of the interrupt controller 105 as shown in FIG. 1, and further description is therefore not detailed for brevity. The group of rate control logics 525 is used for respectively monitoring served interrupt request events, and then outputting calculated rate indices to the receiving circuit 115 of the interrupt controller 505 for generating urgency level associated to each interrupt input.

According to a fourth embodiment of the present invention, the controlling circuit 120 of the interrupt controller 105 as shown in FIG. 1 is arranged to employ a time-division manner to generate and route one interrupt request event to a processor such as the processor 110A during one arbitration at a time, and generate and route another interrupt request event to another processor such as the processor 110B during another arbitration at another time. The controlling circuit 120 is able to evaluate interrupt inputs for a specific processor at an arbitration to generate the interrupt request event for the specific processor. In this embodiment, the interrupt input arbitration is completed during one clock cycle; however, this is not intended to be a limitation of the present invention. In another embodiment, the interrupt input arbitration can be performed and finished during half a clock cycle or multiple clock cycles. These modifications all fall within the scope of the present invention.

It should be noted that any of the operations of the above-described embodiments can be combined with other operations based on designers' requirements. Accordingly, any modifications associated with the above-mentioned operations described in the embodiments of the present invention should fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An interrupt controller, coupled to a plurality of processors, being utilized for routing at least one interrupt request event to at least one of the processors, wherein the interrupt controller comprises:
   a receiving circuit, for receiving at least one interrupt input; and
   a controlling circuit, coupled to the receiving circuit, for generating at least one interrupt request event based on the received interrupt input and routing the interrupt request event generated to at least one of the processors;
   wherein the plurality of processors includes at least a first processor and a second processor, at least the first and second processors being utilized for processing interrupt request event(s); and the controlling circuit is able to withdraw/cancel assertion of an interrupt request event that has been transmitted to the first processor.

2. The apparatus of claim 1 for processing the interrupt request event in a system having the plurality of processors, the apparatus comprising:
   the plurality of processors; and
   the interrupt controller;
   wherein the first processor is arranged to confirm whether to withdraw/cancel the interrupt request event that has been transmitted to the first processor after observing cancellation of the interrupt request event, and to notify the interrupt controller of a confirmed result.

3. The apparatus of claim 2, wherein the first processor is arranged to send an acknowledgement indication to the interrupt controller by asserting an interrupt acknowledgement (ACK) signal for indicating that the interrupt request event has been accepted by the first processor.

4. The apparatus of claim 2, wherein the first processor is arranged to send a busy indication to the interrupt controller by asserting an interrupt busy signal for indicating that the interrupt request event is not accepted by the first processor yet or has been rejected by the first processor.

5. The apparatus of claim 4, wherein the interrupt controller is arranged to transmit the interrupt request event to the second processor after observing the busy indication sent by the first processor.

6. An interrupt controller, coupled to a plurality of processors, being utilized for routing at least one interrupt request event to at least one of the processors, wherein the interrupt controller comprises:
   a receiving circuit, for receiving at least one interrupt input; and
   a controlling circuit, coupled to the receiving circuit, for generating at least one interrupt request event based on the received interrupt input and routing the interrupt request event generated to at least one of the processors;
   wherein the plurality of processors includes at least a first processor and a second processor, at least the first and second processors being utilized for processing interrupt request event(s); and the controlling circuit calculates average loading values for the plurality of processors, maintains weighting values for the plurality of processors according to the average loading values, and sends interrupt request events to the plurality of processors according to the weighting values that respectively correspond to the processors.

7. The apparatus of claim 6 for processing the interrupt request event in a system having the plurality of processors, the apparatus comprising:
   the plurality of processors; and
   the interrupt controller;
   wherein the weighting values are adjusted by the controlling circuit depending on how soon the plurality of processors accept interrupt request events.

8. An interrupt controller, coupled to a plurality of processors, being utilized for routing at least one interrupt request event to at least one of the processors, wherein the interrupt controller comprises:
   a receiving circuit, for receiving at least one interrupt input; and
   a controlling circuit, coupled to the receiving circuit, for generating at least one interrupt request event based on the received interrupt input and routing the interrupt request event generated to at least one of the processors;
   wherein the plurality of processors includes at least a first processor and a second processor, the first and second processors being utilized for processing interrupt request event(s); and, when sending an interrupt request event, the controlling circuit is arranged to send pre-request events to the plurality of processors by asserting interrupt pre-request signals along with same interrupt vector number for inquiring if each of the plurality of processors is able to accept the interrupt request event.

9. The apparatus of claim 8 for processing at least one interrupt request event in a system having a plurality of processors, the apparatus comprising:
   the plurality of processors; and
   an interrupt controller;
   wherein at least one processor replies to an acknowledgement indication to the interrupt controller by asserting an interrupt acknowledgement signal to indicate that the processor is able to accept the interrupt request event; and, the first and second processors reply to acknowledgement indications to the interrupt controller, and the interrupt controller is arranged to select one of the first and second processors and send the interrupt request event to a selected processor.

10. The apparatus of claim 9, wherein the interrupt controller is arranged to send the interrupt request event to the first processor by asserting an interrupt request signal corresponding to the first processor and then de-asserting an interrupt pre-request signal corresponding to the first processor when the interrupt controller determines that the interrupt request event is to be accepted by the first processor; and, the interrupt controller is arranged to withdraw/cancel pre-request events sent to the plurality of processors except for the first processor by de-asserting interrupt pre-request signals corresponding to the plurality of processors except of the first processor.

11. An interrupt controller, coupled to a plurality of processors, being utilized for routing at least one interrupt request event to at least one of the processors, wherein the interrupt controller comprises:
 a receiving circuit, for receiving at least one interrupt input; and
 a controlling circuit, coupled to the receiving circuit, for generating at least one interrupt request event based on the received interrupt input and routing the interrupt request event generated to at least one of the processors;
 wherein the plurality of processors includes at least a first processor and a second processor, the first and second processors being utilized for processing interrupt request event(s); and the controlling circuit is implemented with a plurality of rate control logics to generate rate indices for the receiving circuit to dynamically adjust urgency levels for associated interrupt inputs.

12. The interrupt controller of claim 11, wherein the interrupt controller is arranged to raise the urgency level of the interrupt request event when a rate index indicates that a served frequency for the associated interrupt inputs is lower than an expected rate value.

13. The interrupt controller of claim 11, wherein a processor included within the processors is arranged to take an urgent interrupt request event immediately when an urgency level of the urgent interrupt request event is higher than an urgency level of an interrupt input that is currently served.

14. The interrupt controller of claim 11, wherein the urgency levels are initially determined according to priority values of the associated interrupt inputs.

15. An interrupt controller, coupled to a plurality of processors, being utilized for routing at least one interrupt request event to at least one of the processors, wherein the interrupt controller comprises:
 a receiving circuit, for receiving at least one interrupt input; and
 a controlling circuit, coupled to the receiving circuit, for generating at least one interrupt request event based on the received interrupt input and routing the interrupt request event generated to at least one of the processors;
 wherein the plurality of processors includes at least a first processor and a second processor, the first and second processors being utilized for processing interrupt request event(s); and the controlling circuit is arranged to employ a time-division manner to generate and route one interrupt request event to one processor included within the plurality of processors during one arbitration at a time, and generate and route another interrupt request event to another processor included within the plurality of processors during another arbitration at another time.

16. A method for processing at least one interrupt request event in a system having a plurality of processors, comprising:
 receiving at least one interrupt input;
 generating at least one interrupt request event based on the received interrupt input;
 routing the interrupt request event generated to at least one of the processors;
 withdrawing/canceling assertion of an interrupt request event that has been transmitted to a first processor; and
 confirming whether to withdraw/cancel the interrupt request event that has been transmitted to the first processor after observing cancellation of the interrupt request event;
 wherein the plurality of processors include at least the first processor and a second processor, and the first and second processors are utilized for processing interrupt request event(s).

17. The method of claim 16, further comprising:
 sending an acknowledgement indication by asserting an interrupt acknowledgement (ACK) signal for indicating that the interrupt request event has been accepted by the first processor.

18. The method of claim 16, further comprising:
 sending a busy indication by asserting an interrupt busy signal for indicating that the interrupt request event is not accepted by the first processor yet or has been rejected by the first processor.

19. The method of claim 18, further comprising:
 transmitting the interrupt request event to the second processor after observing the busy indication sent by the first processor.

20. A method for processing at least one interrupt request event in a system having a plurality of processors, comprising:
 receiving at least one interrupt input;
 generating at least one interrupt request event based on the received interrupt input;
 routing the interrupt request event generated to at least one of the processors; and
 sending an interrupt request event to at least one of the processors according to weighting values that respectively correspond to the processors;
 wherein the plurality of processors include at least a first processor and a second processor, and the first and second processors are utilized for processing interrupt request event(s).

21. The method of claim 20, wherein the weighting values are generated/assigned to the processors based on respective average loadings of the processors correspondingly.

22. A method for processing at least one interrupt request event in a system having a plurality of processors, comprising:
 receiving at least one interrupt input;
 generating at least one interrupt request event based on the received interrupt input;
 routing the interrupt request event generated to at least one of the processors; and
 before sending an interrupt request event, sending pre-request events to the plurality of processors by asserting interrupt pre-request signals along with same interrupt vector number for inquiring if each of the plurality of processors is able to accept the interrupt request event;
 wherein the plurality of processors include at least a first processor and a second processor, and the first and second processors are utilized for processing interrupt request event(s).

23. The method of claim 22, further comprising:
 replying to an acknowledgement indication using at least one processor by asserting an interrupt acknowledgement signal to indicate that at least one processor is able to accept the interrupt request event;
 selecting one of the first and second processors when the first and second processors reply acknowledgement indications; and
 sending the interrupt request event to a selected processor.

24. The method of claim 23, wherein the step of sending the interrupt request event to the selected processor comprises:
- when the interrupt request event is determined to be accepted by the first processor, sending the interrupt request event to the first processor by asserting an interrupt request signal corresponding to the first processor and then de-asserting an interrupt pre-request signal corresponding to the first processor; and
- withdrawing/canceling pre-request events sent to the plurality of processors except for the first processor by de-asserting interrupt pre-request signals corresponding to the plurality of processors except of the first processor.

25. A method for processing at least one interrupt request event in a system having a plurality of processors, comprising:
- receiving at least one interrupt input;
- generating at least one interrupt request event based on the received interrupt input;
- routing the interrupt request event generated to at least one of the processors; and
- dynamically adjusting an urgency level of the interrupt request event;
- wherein the plurality of processors include at least a first processor and a second processor, and the first and second processors are utilized for processing interrupt request event(s); and, rate indices are generated for dynamically adjusting urgency levels for associated interrupt inputs.

26. The method of claim 25, wherein the step of dynamically adjusting the urgency level of the interrupt request event comprises:
- raising the urgency level of the interrupt request event when a rate index indicates that a served frequency for the associated interrupt inputs is lower than an expected rate value.

27. The method of claim 25, further comprising:
- taking an urgent interrupt request event immediately when an urgency level of the urgent interrupt request event is higher than an urgency level of an interrupt input that is currently served.

28. The method of claim 25, further comprising:
- determining the urgency levels according to priority values of the associated interrupt inputs initially.

29. A method for processing at least one interrupt request event in a system having a plurality of processors, comprising:
- receiving at least one interrupt input;
- generating at least one interrupt request event based on the received interrupt input;
- routing the interrupt request event generated to the at least one of the processors;
- employing a time-division manner to generate and route one interrupt request event to one processor included within the plurality of processors during one arbitration at a time; and
- generating and routing another interrupt request event to another processor included within the plurality of processors during another arbitration at another time;
- wherein the plurality of processors include at least a first processor and a second processor, and the first and second processors are utilized for processing interrupt request event(s).

* * * * *